United States Patent Office 2,764,031
Patented Sept. 25, 1956

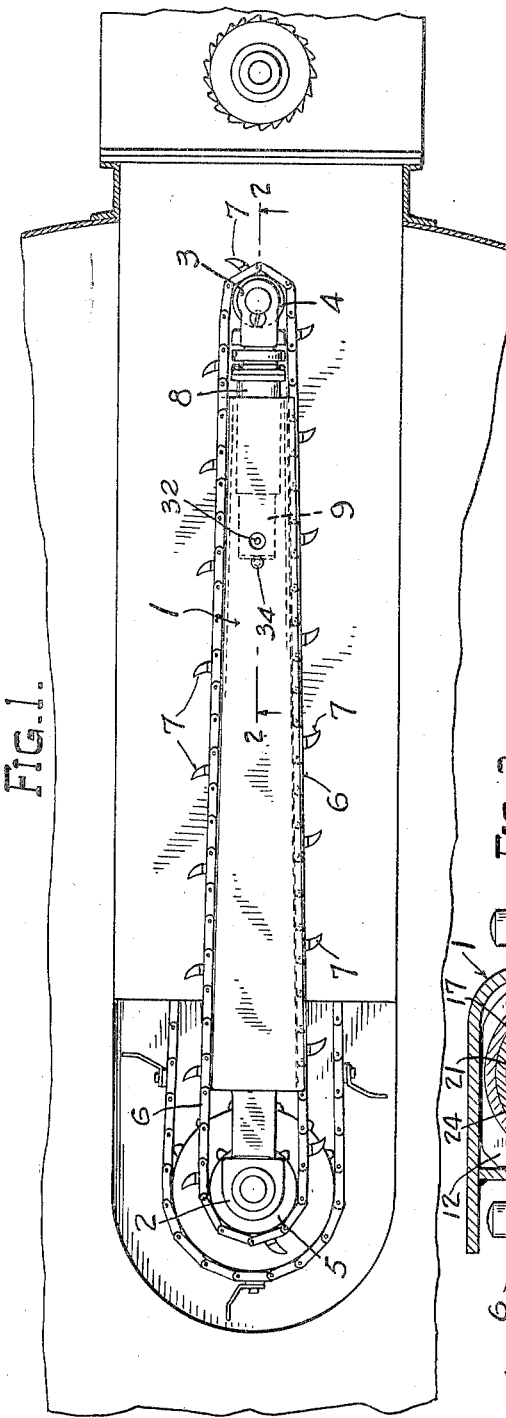
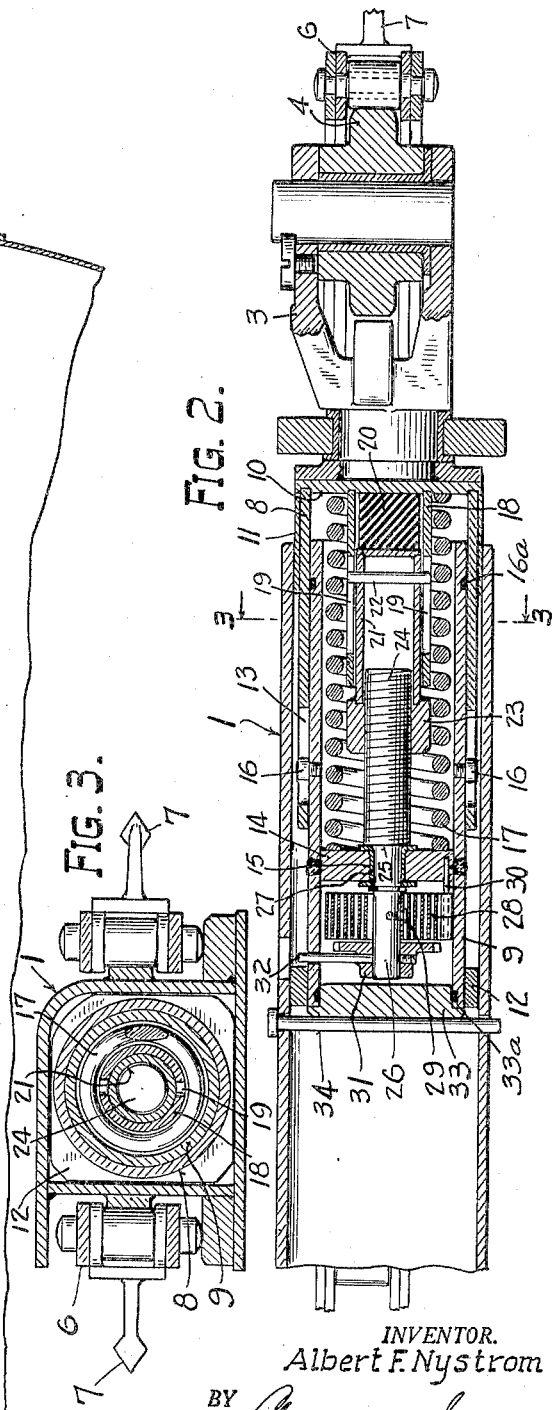

2,764,031

COMPRESSION SPRING CHAIN TIGHTENER

Albert F. Nystrom, Prairie du Sac, Wis., assignor to A. O. Smith Corporation, Milwaukee, Wis., a corporation of New York Application July 22, 1953, Serial No. 369,679

9 Claims. (Cl. 74—242.14)

This invention relates to a tensioning device for maintaining an endless belt or chain and the like in a taut condition.

One object of the invention is to provide a tensioning device for a chain or like drive which automatically serves to maintain the chain in a taut condition during its operation.

Another object of the invention is to provide a tensioning device which will steadily take up the slack in an endless chain and maintain the chain in a taut condition.

Another object is to provide a tensioning device wherein the spring means exerting the tensioning force is prevented from oscillating or backing up during operation of the endless chain or belt and the like.

Another object is to provide a tensioning device which may be disposed within a generally hollow housing whereby the apparatus is afforded substantial protection for extraneous matter from without the housing.

Briefly the invention is directed to a tensioning device comprising a spring which acts against a driven member, such as a chain, to maintain the member in a taut condition. To keep the spring from backing up and releasing its force against the driven member under varying load conditions, a device is employed to steadily take up the slack and prevent the spring from re-compressing after expanding. Thus the spring is prevented from oscillating or backing up and continuous tension of the spring is assured to maintain the chain taut at all times.

These and other objects of the invention will appear from the following description when taken in conjunction with the drawing in which:

Figure 1 is a top plan view of the invention showing the same adapted for disposition in a cutter arm of a bottom unloader for a storage structure;

Fig. 2 is an arranged longitudinal sectional view taken on line 2—2 of Figure 1; and Fig. 3 is a sectional view on line 3—3 of Fig. 2.

Referring to the drawings the invention is shown as applied to an unloading apparatus for a storage structure. The unloading apparatus to which the invention has been applied has a cutter arm 1 which is secured to a hub 2 centrally disposed of the floor of the storage structure. A forked member 3 is secured to the outer end of the arm 1 and rotatably supports carrier wheel 4. A drive sprocket 5 is disposed beneath the hub 2, and co-operates with carrier wheel 4 to support a chain 6 provided with spaced cutter teeth 7, which engages and dislodges materials stored within the storage structure.

The arm 1 is a generally elongated, hollow housing preferably fabricated from metal plates. The outer end of the housing is open to receive the tightening apparatus of this invention with the forked member 3 attached thereto.

The tightening apparatus comprises a pair of tubular members 8 and 9 which telescope to form an expandable housing. The outer end of tubular member 8 is closed by an end plate 10. The forked member 3 is secured to the outer surface of end plate 10 by bolts or otherwise. To dispose the tightening apparatus centrally of the cutter housing and prevent its rotation within the housing an annular bearing 11 surrounds tubular member 8 and extends rearwardly from end plate 10 and an annular bearing 12 is disposed on the rearward portion of tubular member 9. Tubular member 8 is further provided with a pair of longitudinal slots 13 which are disposed diametrically opposite of the member adjacent the inner end thereof.

Tubular member 9 forming a part of the telescopic housing is slidably received within the tubular member 8. A circular batter block 14, having a central opening 15 therethrough, is secured within tubular member 9 preferably by welding. A short distance outwardly of block 14, tubular member 9 is exteriorly provided with a pair of diametrically opposite cap screws 16 which are radially aligned with the slots 13 of tubular member 8 and are slidably disposed therein. The length of slots 13 represents the limiting positions of the telescopic housing. When the set screws 16 are positioned at the inner end of slots 13 the housing is fully extended. The housing is compressed to its limiting position when the outer end of the slots 13 of tubular member 8 engage the cap screws 16, or when tubular member 9 abuts end plate 10, depending on which contact is desired. An O-ring 16a may be recessed between members 8 and 9 to keep out extraneous matter where conditions require.

To effect expansion between the members 8 and 9 a helical spring 17 is disposed therein extending between batter block 14 and the end plate 10. Restrained inwardly by batter block 14, the spring 17 exerts a force against end plate 10, extending the housing formed by tubular members 8 and 9. Forked member 3 is thereby urged outwardly to take up the slack in chain 6 due to wear in the chain.

To prevent spring 17 from backing up due to varying loads on the chain 6, a slack absorbing device is employed in conjunction with spring 17. This device comprises a tubular guide member 18 which extends inwardly from end plate 10 within the helical spring 17. The member 18 is secured endwise to end plate 10 and is longitudinally aligned with the opening 15 of batter block 14. Adjacent its inner end, guide member 18 is formed with a pair of diametrically opposite slots 19. A cushion or shock absorber 20 preferably made of rubber is disposed in guide member 18 adjacent end plate 10. A hollow plunger 21 is slidably disposed within the guide member 18 and abuts against shock absorber 20. To prevent turning of plunger 21 within guide member 18, a pin 22 extends through the diameter of the plunger 21 adjacent its outer end and is slidably received within the diametrically opposite slots 19 of guide member 18. In this manner the plunger 21 is restricted to longitudinal movement within guide member 18.

An internally threaded collar 23 is attached to the inner end of plunger 21 and the diameter of the threaded bore of the collar is slightly less than the internal diameter of plunger 21.

To effect longitudinal movement of plunger 21 a threaded member 24 is rotatably disposed in opening 15 of batter block 14 and engages the threaded collar 23 of the plunger. The threaded member 24 is formed with a shoulder 25 and a long shank 26. The opening 15 of batter block 14 is preferably lined with a bushing 27. The shank 26 of threaded member 24 extends through the bushing 27 with the shoulder 25 abutting against the outer end of bushing 27. A suitable washer and snap ring may be disposed inwardly of batter block 14 on shank 26 to prevent outward longitudinal movement of threaded member 24. Thus, threaded member 24 is free to rotate within bushing 27 of opening 15 and is restrained from all longitudinal movement. Rotation of threaded member 24 produces resultant longitudinal movement of plunger 21 which is restrained from rotational movement within guide member 18.

When spring 17 causes the housing to extend to take up slack in chain 6, plunger 21 is automatically biased outwardly to prevent spring 17 from backing up. Automatic biasing of plunger 21 is brought about by a coil or motor spring 28 disposed within tubular member 9 inwardly of batter block 14. The inner end of coil spring 28 is secured to the shank 26 of threaded member 24 by a drive pin 29 and the outer end is secured to batter block 14 by a pin 30. The spring 28 will automatically cause a rotation of threaded member 24 and resultant outward movement of plunger 21 as long as the force exerted by spring 28 is greater than the opposing force exerted on plunger 21 by the shock absorber 20. When the opposing force of shock absorber 20 becomes the greater, the force exerted by spring 28 is overcome and rotation of threaded member 24 ceases.

Reverse or inward movement of plunger 21, and threaded member 24, is preferably prevented by utilizing a self-locking thread engagement between member 24 and collar 23 of plunger 21. As the threaded member 24 advances into collar 23 it is always locked in its advanced position against reverse rotation and it can only be reversed by a suitable tool upon disassembly of the parts.

To load or wind up coil spring 28, a hex nut 31 may be secured on the end of shank 26 for turning as by a wrench or other means. The loaded spring may be locked by a pin 32 extending through aligned holes in tubular member 9 and nut 31. Cutter arm 1 is provided with a suitable opening for removal of pin 32 when the tightening device is placed in service.

To present extraneous matter entering tubular member 1 a cap 33 may close off the inner end. An O-ring 33a may be recessed between the cap 33 and tubular member 9 to protect the working elements. A suitable plug, not shown, may be placed in the opening of tubular member 9 when pin 32 is removed during service.

So that the tensioning device described will exert a force outward, the tubular member 9 must be restrained from moving inwardly within the arm 1. This may be accomplished in a number of ways, but preferably the cap 33 closing member 9 abuts against a headed pin 34 which extends through aligned holes provided in the cutter arm. This method is preferred because it lends itself readily to varying the arm length between the carrier wheel 4 and sprocket 5. The arm length may be varied by providing additional aligned holes, not shown, in the cutter arm housing at varying distances inwardly.

To place the described device in operation the coil spring 28 must first be loaded and lock pin 32 inserted to maintain the loaded spring. Loading may be accomplished by turning nut 31 secured on the end of shank 26 of threaded member 24 with a wrench. Loading of the spring 28 will also result in plunger 21 being drawn inwardly on threaded member 24. Loaded in this manner the tensioning device with forked member 3 attached is inserted into the cutter arm housing as far as the abutting pin 34 permits. At this point the helical spring 17 remains fully extended and inoperative.

The compression and loading of helical spring 17 is preferably accomplished in the process of returning the chain 6 to its operating position around carrier wheel 4 and sprocket 5. As the disunited ends of the chain 6 are drawn together to be joined, the forked member 3 exerts a pressure on end plate 10 compressing the helical spring 17. After the chain ends are united, spring 17, acting outwardly against end plate 10, maintains the chain in a taut condition. When the chain 6 is in place the locking pin 32 may be removed. The coil or motor spring 28 will then cause threaded member 24 to rotate which in turn will advance plunger 21 to abut against the cushion 20.

When the cutter chain 6 is placed in service the shock absorber 20 serves to protect the plunger 21 and threaded member 24 from shock loads and allows for chordal action imposed by the chain. As chain 6 loosens through wear, helical spring 17 exerts a force against end plate 10 serving to maintain the chain or belt and the like taut. As the end plate 10 is forced outwardly by spring 17 pressure between plunger 21 and cushion 20 is relieved. The coil spring 28 will thereupon cause threaded member 24 to rotate moving the plunger 21 outwardly until pressure between plunger 21 and cushion 20 prevents further outward movement. The self-locking thread between members 23 and 24 prevents the threaded member 24 from reversing itself. Thus as end plate 10 is advanced outwardly by helical spring 17 to tension chain 6 the coil spring 28 and threaded member 24 cause plunger 21 to follow up plate 10 and take up the slack therebetween.

The tensioning apparatus was herein described in connection with a cutter arm for a storage structure bottom unloader. It is equally suited for many other applications. As herein described the apparatus is substantially protected from extraneous matter. It is obvious that in many other applications for such apparatus this precaution is not so critical.

The described threaded follow-up mechanism permits automatic and steady adjustment in taking up slack in the tightening apparatus. Beyond limits permitted by the cushion or shock absorber the tensioning spring is prevented from oscillating or backing up by the follow-up mechanism. Thus the tensioning spring may accommodate spasmodic variations in tautness of the chain due to shock loads or chordal action and yet normally will maintain the chain in a taut condition and thus prevent excessive wear of the driven member.

Various embodiments of the invention may be employed within the scope of the following claims.

I claim:

1. A tensioning device for an endless driven member, comprising an expandable housing having a carrier at one end thereof for engaging the driven member and restrained against movement at the other end, spring means disposed within said housing and exerting a force to expand said housing and tension said driven member, a guide member disposed within said housing, a piston slidably disposed within said guide member, means to bias said piston to exert a force against the end of said housing in the same direction and of a lesser magnitude than said first named force to take up the slack between the piston and the carrier end of the housing as the housing is expanded, means to prevent reverse movement of said piston within said guide member, and a resilient member disposed within said guide member between the piston and the end of the housing to accommodate spasmodic variations in the tension of said driven member due to chordal action and shock loads.

2. Apparaus for tensioning an endless driven member, comprising an expandable housing having a carrier at one end thereof for engaging the driven member and restrained against movement at the other end, a stop disposed within said housing and having an axial opening therethrough, a cylindrical guide disposed within said housing at the carrier end thereof and longitudinally aligned with said opening, a helical spring disposed in said housing around said guide between the carrier end of said housing and said stop, said spring exerting a force against the carrier end of said housing to tension said driven member, a piston slidably disposed within said guide, a threaded member having its shank rotatably disposed within said opening and being in threaded engagement with said piston, means to rotate the threaded member and thereby move the piston against the carrier end of said housing to take up the slack therebetween as the helical spring expands to tension the driven member, resilient means disposed between said piston and the end of said housing for accommodating shock loadings encountered by said driven member, and means associated with said threaded member to prevent reverse movement of said piston to thereby limit contraction of said expandable housing as permitted by the resilient means.

3. In a bottom unloader for a storage structure having a rotating cutter arm adapted to dislodge and move the stored material as the same is rotated around the floor of the structure, carrier means provided at the outer end of the cutter arm, a cutter chain supported by the carrier means for movement around said arm, an expandable housing disposed within said arm secured at the outer end to the carrier means and restrained against movement at the inner end thereof, spring means disposed within said housing and exerting a force to expand the housing to thereby tension the chain, a piston slidably disposed within said housing, means to bias said piston outwardly to exert a continuous force against the outer end of said housing to take up the slack therebetween as the spring means expands to tension the driven member, means for preventing reverse movement of said piston, and resilient means disposed between the piston and the outer end of the housing to accommodate spasmodic variations in the tension of the driven member due to chordal action or shock loads.

4. An apparatus for tensioning an endless driven member traveling about a plurality of supported carriers, one of said carriers being movable relative to the other carriers to tension the driven member, which comprises an expandable housing connected at one end to said movable carrier and restrained against movement at the other end, a spring disposed within the housing and exerting a force against the movable carrier to urge said movable carrier against the driven member to tension same, a piston slidably disposed within the housing, a rotatable shaft secured against longitudinal movement with respect to said housing and threadedly engaging said piston, spring means to rotate the shaft and urge the piston against the end of the housing to take up the slack therebetween as said movable carrier is forced outwardly by said first named spring, means for preventing counterrotation of said shaft and thereby maintaining said piston in its extended condition, and resilient means disposed between the piston and the outer end of said housing to accommodate spasomdic variations in the tenison of the driven member due to shock loads.

5. A tensioning device for a driven member rotatably driven around a support member, which comprises an expandable housing associated with the support member and having a carrier at one end thereof for engaging the driven member and restrained against movement at the other end, a spring disposed within the housing and exerting a force outwardly against said driven member to tension the same, a sliding member disposed within said housing and biased outwardly to exert a force against said driven member in the same direction and in alignment with said first named force to take up slack between said sliding member and the driven member as the driven member is forced outwardly and tensioned by the spring, and means for preventing inward movement of said sliding member to limit the spasmodic movements of the driven member due to shock loads.

6. A tensioning device for a chain rotatably driven around a support member, which comprises an expandable housing associated with the support member and having a carrier at one end thereof for engaging the chain and restrained at the other end, a spring disposed within the housing and exerting a force outwardly against the chain to tension the same, a sliding member disposed within said housing and biased outwardly to exert a force against the chain in the same direction and in alignment with said first named force to take up the slack between the sliding member and the chain as the chain is forced outwardly and tensioned by the spring, means for preventing inward movement of said sliding member, and cushioning means interposed between said sliding member and the chain to cushion the spasmodic movements of the chain due to chordal action and shock loads.

7. An apparatus for tensioning an endless driven member traveling about a plurality of supported carriers, one of said carriers being movable relative to the other carriers to tension said driven member, which comprises an expandable housing connected at one end to said movable carrier and restrained against movement at the other end, a fixed stop disposed within the housing and having an opening therethrough axially of said housing, a helical spring disposed between the stop and outer end of the housing and exerting a force against the outer end of said housing to expand the housing and urge the movable carrier outwardly to tension the driven member, a cylindrical guide provided in said housing and connected to the outer end thereof in alignment with the opening of the fixed stop, a piston slidably disposed within the guide, a shaft rotatably disposed within the opening of said stop and having the outer end thereof threadedly engaging the piston, a coil spring connected to the inner end of said shaft for rotating the shaft in a given direction and thereby urging the piston against the outer end of said housing to take up the slack therebetween as said housing is expanded by the force of said helical spring during tensioning of driven member, means for preventing counter-rotation of the shaft to thereby maintain the piston in its extended condition, and cushioning means disposed between the piston and the outer end of the housing to cushion spasmodic variations of tautness in the driven member due to chordal action and shock loads.

8. Tensioning apparatus for an endless driven member, comprising a carrier assembly engaging the driven member and movable with respect to the driven member to tension the same, biasing means urging the carrier assembly into tensional engagement with the driven member and subject to oscillations due to varying loads on the driven member, a follower member engaging the carrier assembly and movable in the direction of the carrier assembly, second biasing means urging the follower member into engagement with the carrier assembly to take up the slack between the carrier assembly and driven member under the varying loads to which the driven member is subjected as the first biasing means urges the carrier assembly into tensional engagement with the driven member, and means preventing reverse movement of the follower member to thereby maintain the carrier assembly in its extended position and limit the oscillation thereof due to the variations in load on the driven member.

9. Tensioning apparatus for an endless driven member, comprising a carrier assembly engaging the driven member and movable with respect to the driven member to tension the same, a pre-loaded helical spring urging the carrier assembly into tensional engagement with the driven member and subject to oscillations due to varying loads on the driven member, guide means provided on the carrier means, a follower member slidably disposed in said guide means and engaging the carrier assembly and movable in the direction of the carrier assembly, biasing means urging the follower member into engagement with the carrier assembly to take up the slack between the carrier assembly and driven member under the varying loads to which the driven member is subjected as the helical spring extends the carrier assembly into tensional engagement with the driven member, and means preventing reverse movement of the follower member to thereby maintain the carrier assembly in its extended position and limit the oscillation thereof due to variations in load on the driven member.

References Cited in the file of this patent

UNITED STATES PATENTS

| | | |
|---|---|---|
| 1,442,569 | Holt | Jan. 16, 1923 |
| 2,068,070 | Pray | Jan. 19, 1937 |
| 2,284,821 | Heaslet | June 2, 1942 |
| 2,453,750 | Kamlookhine | Nov. 16, 1948 |
| 2,625,829 | Nolt | Jan. 20, 1953 |
| 2,702,485 | Nadherny | Feb. 22, 1955 |

FOREIGN PATENTS

| | | |
|---|---|---|
| 791,664 | France | Sept. 30, 1935 |